Jan. 23, 1962 A. POLICH, JR 3,017,938
METHOD AND APPARATUS FOR WEIGHING
Filed Oct. 28, 1957 2 Sheets-Sheet 1

INVENTOR:
ANTHONY POLICH, JR.
BY
ATT'Y

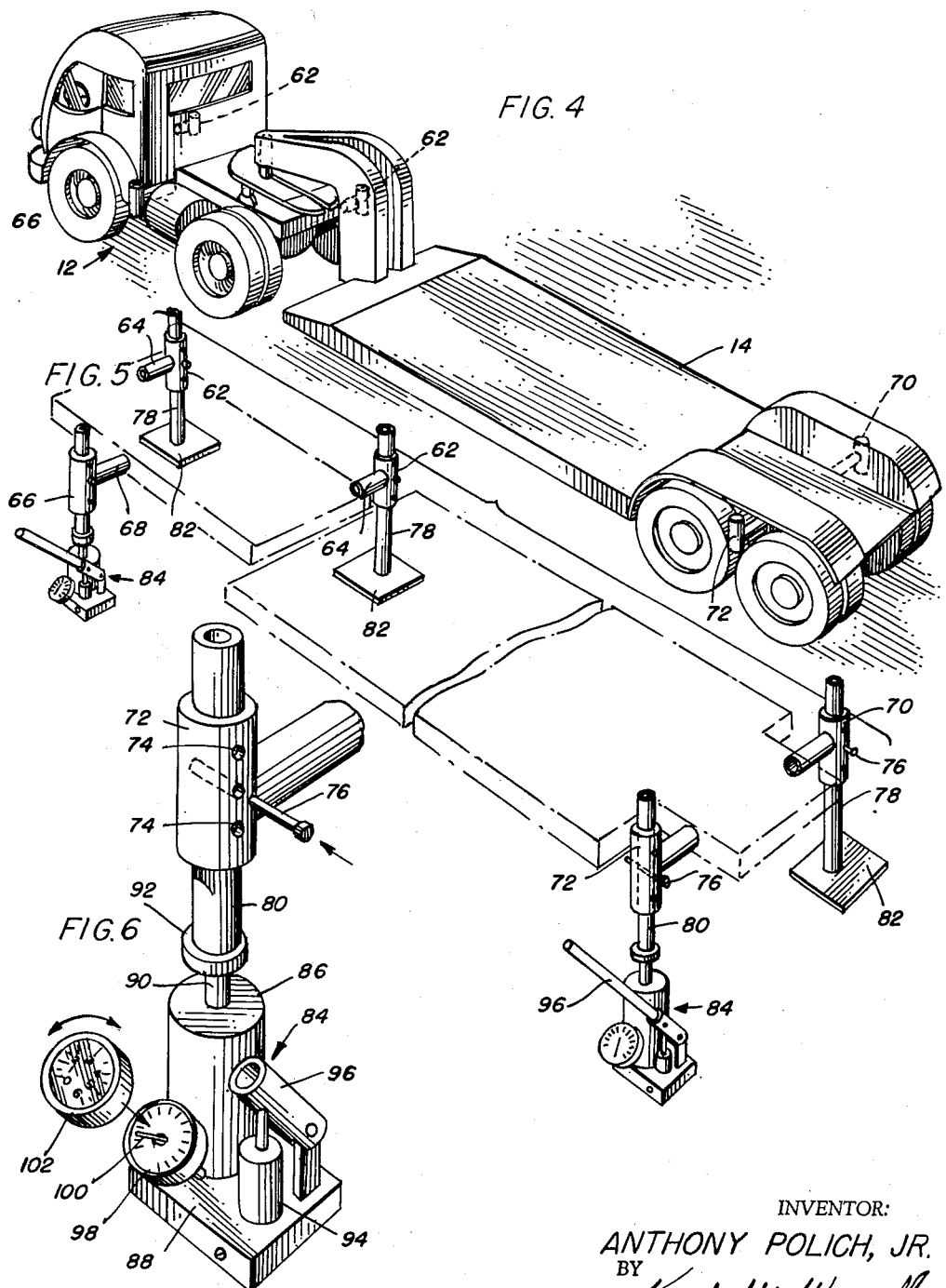

United States Patent Office 3,017,938
Patented Jan. 23, 1962

3,017,938
METHOD AND APPARATUS FOR WEIGHING
Anthony Polich, Jr., 9228 W. 47th St., Brookfield, Ill.
Filed Oct. 28, 1957, Ser. No. 692,628
3 Claims. (Cl. 177—141)

This invention relates in general to a new and improved method of weighing, and is more particularly described as an apparatus for weighing heavy trucks or trailers and the loads therein either separately or in conjunction with the trucks. The same method of weighing may also be applied to other kinds of weights either mobile or movable in one dimension, or at least one side or end of the load being movable or tiltable about a pivot or support at the other side or end.

In weighing large trailers and trucks, it frequently happens that no platform or roadway scale is available of sufficient size to receive the entire truck or trailer and heretofore it has therefore been impossible to weight either the truck or a load thereon with any degree of accuracy or to weight a load when mounted upon a truck without also including the weight of the truck.

The present invention provides a simple apparatus which may be applied to any large movable body such as a truck or trailer, or a load upon such a truck by simply raising one side or one end of the load, whatever it may be, relative to a fixed support at the correspondingly opposite side or end of the load.

While this same method may be applied to various types of weights and loads, it is particularly applicable to loads which are of such a great length that they cannot be received upon and measured by the existing types of scales.

An important object of the invention is to provide an improved method of weighing by tilting an article about one side or one end, and applying a weighting apparatus to the corresponding opposite side or end.

A further object of the invention is to provide means for mounting a load to pivot or tilt about one side or end and to measure the force required to raise or tilt the load about the opposite side or end.

Still a further object of the invention is to provide an apparatus which has a mounting upon which it may swing at a predetermined distance from one end and a weight measuring apparatus for engaging the opposite end for tilting or raising it at a predetermined distance from the other end.

Still a further object of the invention is to provide a truck weighing apparatus having means for raising one end or one side of a truck body by foot pressure or a motor pump to register the weight of the body and a load therein.

Other objects of the invention will appear in the specification and will be apparent from the accompanying drawings, in which FIG. 1 is a perspective view of a truck having a body tiltable about the rear end and equipped with a truck weighing apparatus in accordance with the present invention;

FIG. 4 is a perspective view of a truck and trailer to which the present method and apparatus is applied;

FIG. 5 is a somewhat diagrammatic perspective view illustrating the method and apparatus for measuring the weight of a truck and trailer as shown in FIG. 4; and FIG. 6 is an enlarged perspective view of a portion of the apparatus shown in FIG. 5.

In weighing large and heavy loads such as carried by long trucks and enlarged truck bodies, it is difficult to accurately weigh the contents of a truck because there are no roadway scales available except at a considerable distance which would materially increase the travel and the expense of trucking. The present invention provides a method and a relatively simple apparatus employing the method to measure a load upon a truck and also to measure the weight of the truck itself, if desired, the measuring apparatus being of such a construction that it can easily be carried by the truck and applied thereto whenever desired.

In carrying out the method of this invention, a weight to be measured is mounted so that it may be tilted or raised about the opposite side or end to a sufficient degree to indicate and record the weight or the raising pressure necessary to raise or tilt the load about the opposite side. In practice, a definite support is provided at one side or end of the weight so that the weight or load to be raised is firmly supported at that side, the position of the support being at the same distance from its adjacent side or end as the raising or weighing support at the opposite side or end is from the edge thereof. To have these supports at different distances from the sides or ends would require different calculations or factors in determining the total weight, but if the opposite supports are approximately at the same distance and not too far from their respective ends or sides, the total weight of the load will be twice that recorded by the weighing device. This would not be true if a vehicle body for example, is raised to a large degree as in tilting the body to discharge a load therefrom, but if one end is raised an amount sufficient to clear it from supports at that end, and the other end is pivoted or supported at the same distance from its adjacent end, the total weight of the double amount will be accurate within an amount mush less than 1% and of the estimated order of one part in 2500 or .04 of 1%. This estimated accuracy is true for uniform loads and in a truck, it would apply, for example, to ordinary evenly distributed loads of earth, coal, gravel, small rocks, and many other materials which tend to settle evenly within a container. On loaded vehicles for example, like a trailer truck with a heavy weight such as a bulldozer carried thereon, it is necessary to locate such a load quite evenly between the supporting end and the weighing end. For this reason, in vehicles it is more desirable for greater accuracy to space the bulldozer evenly from the sides of the truck and to measure the weight by tilting the truck sidewise.

Figure 1:
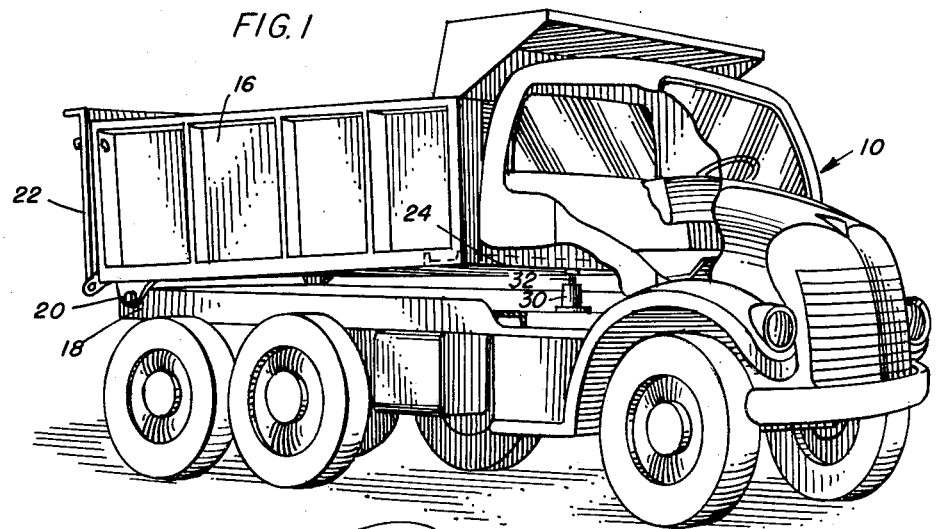

Referring now more particularly to the drawings, the invention is described in connection with a load carrying truck 10 as shown in FIG. 1 or a motor truck 12 and trailer 14 combination as shown in FIG. 4.

In the truck shown in FIG. 1, an open body 16 is mounted at the rear of side frames 18 by means of pivots 20 one at each side of the truck body and at a predetermined distance from the rear end of the truck so that when desired, the truck body may be up-ended for discharging its load at the rear which is normally closed by a pivoted end gate 22.

At the front of the open body 16 and at a distance from the forward end approximately equal to that of the distance of the pivots from the rear end of the truck body is a supporting cross bar 24, and extending across the truck body between the side frames 18 is a rigid supporting cross piece 26 upon which the forward end of the truck body may rest or be supported in its ordinary load carrying position.

Between the cross bar 24 and the cross piece 26 is a pressure lifting device in the nature of a hydraulic jack comprising a cylinder 28 attached to and supported by the cross piece 26 with a piston 30 movable in the cylinder and having a piston rod 32 extending from the cylinder and having a head 34 preferably slightly rounded at the top engaging the under side of the cross bar 24 preferably centrally of the cross bar both transversely and longitudinally. By applying pressure to the cylinder and noting the amount of pressure necessary to raise the front end of the truck body, it is a simple matter to calculate either the weight of the open body itself or of the body with a distributed weight therein. In its lowered position, the truck body preferably is supported upon end contact bearings 36, and it is not necessary to raise the body to a large degree as somewhat exaggerated in FIG. 1, but simply to raise the front end of the truck from its supporting bearings.

A weighing mechanism may be easily installed in a truck and comprises a pressure pump 38 which may be operated by a foot pedal for receiving air or liquid from a reservoir or hydraulic pressure cylinder 42 through a pipe 44 and forcing it through a pipe 46 to the pressure lifting device cylinder 28. A by-pass pipe connection 48 extends around the pump 38 from the reservoir 42 to the pipe 44 and in this bypass is a dashboard valve 50 having an operating handle 52 which may be located for convenience upon the instrument board of the truck. Also connected to the pressure device pipe 46 by means of a pipe 54 is a pressure indicating gauge 56 having a movable indicating arm 58. A graduated transparent cover 60 is provided for rotary movement upon the outside of the gauge 56 so that the weight of the empty truck body may first be obtained, the position of the indicating arm 58 noted and the graduated cover rotated to place its zero indication at the end of the arm so that the weight of material deposited in the truck body may be read directly from the indications on the graduated cover.

With this dial construction, the reverse operation is also possible, that is, the weight of the truck body and the load may be determined by this pressure weighing device, the cover set to register the total weight, and then after the load is discharged, the truck body itself may be weighed and the indication noted on the dial cover and the difference in weight may be deducted from the total weight previously indicated on the dial cover.

In operation, the valve 50 is closed, the foot pump 38 (or a motor driven pump) is operated to apply pressure to the hydraulic jack raising the truck body from its end bearings. The weight is obtained from the pressure gauge 56 and after the weighing is complete, the pump is stopped, the dashboard valve 50 is opened, pressure is relieved in the pressure lifting device and any surplus liquid is returned through the by-pass 48 to the reservoir 42.

Figure 3:
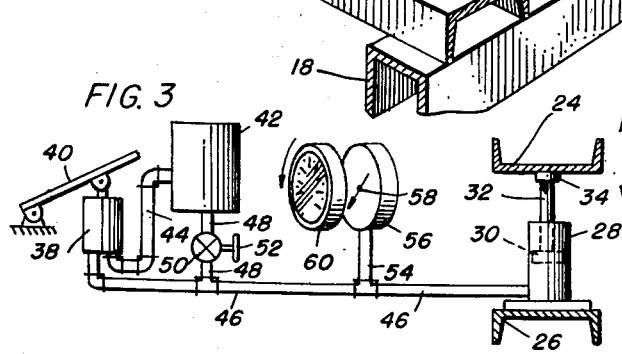
FIG. 3 is a somewhat diagrammatic view of a load raising and measuring apparatus in accordance with this invention.
Figure 3A:
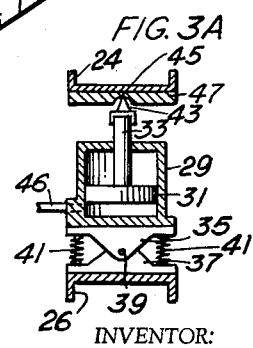
FIG. 3a is a sectional view of one embodiment of the front load raising support and mounting means.

In an actual mounting of a pump between the front supporting cross bar 24 of the truck body and the rigid supporting cross piece 26 of the truck frame as shown in FIG. 3a, a cylinder 29 having a piston and a projecting piston rod 33 has a pivoting base block 35 secured to the bottom thereof, and engaged with a similar pivoting block 37 connected at the top of the bottom cross piece 26 by a pivot 39. Between opposite edges of these blocks may be inserted coil springs 41 tending to center the blocks 35 and 37 with respect to each other and maintain them in an upright position.

At the top of the piston rod 32 is a cap 43 having a rounded or pointed angular extremity which may be elongated to provide a line contact for engagement in a groove 45 in a plate 47 attached to the under side of the cross bar 24. This mounting means allows the truck body or any similarly supported part to be raised and rocked relatively to the bottom support, maintaining the same place or axial distance from the fixed pivot upon which the truck (or other) body is mounted for raising movement.

While the cross bar 24 and the supporting cross piece 26 are represented in FIG. 3a as spaced considerably apart, actually in practice they would be relatively close together in ordinary mountings since the angular movement of the truck body or load about its fixed pivotal support is not intended to be very great, and the spacing of the parts in this figure is somewhat exaggerated in order to illustrate the swiveled mounting of the pressure cylinder and the contact of the piston with the movable load through the limited arc of its movement.

This method may be similarly employed in connection with large trucks, trailers or other weights by tilting them sidewise as indicated in FIGS. 4, 5 and 6 by providing supporting means at one side edge of the truck or trailer lifting means at the other side edge of the truck or trailer, the supporting and lifting means being spaced equally from the longitudinal center line at the opposite sides of the truck. In considering this weighing operation, it is regarded as equivalent to raise a weight or a truck either at one side edge or at one end edge, and about the opposite side or end edge respectively as an axis.

Referring now more particularly to the construction shown, the motor truck 12 preferably has two supporting sleeves 62 spaced apart and rigidly held by a tubular or other support 64 projecting laterally from the chassis frame of the truck. At the opposite side of the truck is a similar force applying sleeve 66 rigidly held in position projecting from the chassis by a tubular support 68. These opposite sleeves 62 and 66 are located at the same distances from the horizontal center line of the vehicle since most vehicles of this kind are substantially symmetrical and of the same weight at both sides of the center line.

Similar supporting and force applying sleeves 70 and 72 may be permanently secured at opposite sides of the trailer truck 14 for weighing it in a similar manner. Each of the supporting sleeves is provided with a plurality of holes 74 at opposite sides, through which bearing pins 76 may be inserted for variously connecting similarly perforated bearing tubes 78 and 80 therein. One set of these tubes 78 may have a foot plate 82 for supporting it upon the ground or any other firm support and the bearing tube 78 corresponding thereto may be adjusted at one side of the vehicle to be weighed by suitably engaging the bearing pin 76 so that the corresponding side of the vehicle may be tipped or tilted slightly about the bearing tube 78 and its supporting sleeve by raising the opposite edge or side.

In the relatively opposite force applying sleeve 72, the bearing tube 80 is similarly adjusted to permit a hydraulic jack 84 to be inserted below the bottom of the bearing tube and comprising a cylinder 86 supported on a base plate 88 which may rest upon the ground or any other firm support, a piston movable in the cylinder having a piston rod 90 extending therefrom with a contact piece 92 between the upper end of the piston rod and the lower end of the bearing tube 80.

Pressure is applied to the hydraulic jack by means of a cylinder pump 94 preferably mounted upon the base 88 and having a hinged handle 96 for operating the jack and connected to apply pressure into the cylinder 86. This pressure is registered by means of a gauge 98 connected to indicate the pressure in the cylinder 86 and having an indicator arm 100 which is visible through a graduated transparent cover 102 through which the indicator arm is visible, and the cover being rotatable to adjust its graduations with the position of the indicator arm.

By raising one side of a vehicle such as the motor truck 12 or the trailer 14 and tilting it about the other side thereof, and doubling the result of the weight indication, the weight of the truck, trailer or other load is closely approximated. In this case, the hydraulic jack 84 is raised by the pump 94 which is manually operated by means of the handle 96, but in practice, a motor pump carried by the motor truck and operated to deliver air or liquid under pressure to the hydraulic jack 84 by means of a hose is a practical and modern equivalent. In this case as in the previous one, the truck or weight may be lowered through the small angle at which it is raised by relieving the pressure in the jack cylinder 86 and disengaging and removing the weight supports and the pumping equipment.

Other weights of all kinds may be accurately measured by this method without requiring other application to commercial scales which usually are not conveniently available, particularly for relatively stationary and heavy objects and materials, and mobile articles of considerable extent such as trucks, trailers and weights thereon, the trucks themselves frequently being over 40 and 50 feet in length, too long to be received by any ordinary roadside or platform scales.

Figure 2:
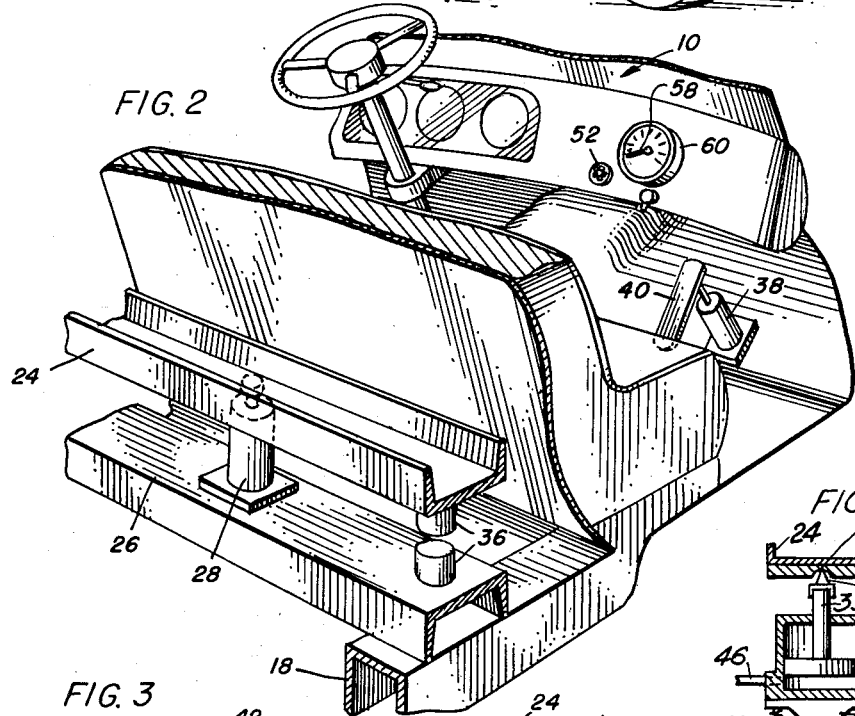
FIG. 2 is a perspective view of a portion of a truck of FIG. 1 showing a foot pump and a load raising plunger.

By this method of weighing, it is a relatively simple matter to measure the quantities transported by trucks even though no other scales or weighing equipment is locally available. All of the necessary apparatus may be carried by or incorporated in the truck and in the installation represented in FIGS. 1–3 for example, the weighing of the load and the body 16 may be effected by the driver without moving from the driver's seat. The equipment shown by FIGS. 4–6 is partly attached to the truck and trailer and partly applicable thereto but loosely carried thereby.

While preferred embodiments of the invention have been described in some detail, they should be regarded by way of illustrations and examples rather than as restrictions or limitations thereof, as many changes in the construction, combination and arrangement of the parts may be made without departing from the spirit and scope of the invention.

I claim:

1. In an apparatus for weighing, means for supporting an article to be weighed for tilting movement about one edge thereof, a lifting device to engage an article to be weighed about the opposite edge thereof, means to indicate the weight of the article when lifted at one edge, and mounting means for pivoting the lifting means to swing with that portion of the article to be lifted maintaining the axial contact distance constant through the angle lifted, the lifting device being connected to the support through a fixed pivotal connection and having means tending to maintain the lifting device resiliently in fixed upright position against tilting in opposite directions.

2. In a truck having a driving cab, the combination with a body mounted in side frames of the truck by pivots spaced a short distance from one edge of the body, of a lifting device mounted on the opposite edge of the truck frame having means to engage the body at the same distance from this edge of the body as the said pivots are from the other edge of the body, operating means in the cab for engaging and actuating the said device to lift the body, indicating means in the cab to indicate the weight of the body when raised by the lifting means at said edge thereof, and mounting means for pivoting the lifting means to swing with that edge of the body to be lifted, maintaining the axial contact distance constant through the angle lifted.

3. In a truck, the combination with weighing mechanism as set forth in claim 2 in which the said lifting device is hydraulic, the operating means in the cab is also hydraulic and is connected by a pipe to said lifting means, a hydraulic pressure cylinder connected to said operating means, a by-pass having a valve connected from the pipe to the hydraulic pressure cylinder, and pressure means in the cab connected through the valve and the pipe to the hydraulic pressure cylinder to indicate the weight of the body raised by said lifting device to determine the weight of the body and its contents from the cab of the truck.

References Cited in the file of this patent

UNITED STATES PATENTS

| | | |
|---|---|---|
| 601,339 | Freeman | Mar. 29, 1898 |
| 1,579,658 | Pugh | Apr. 6, 1926 |
| 1,656,791 | Henderson | Jan. 17, 1928 |
| 1,659,641 | Smith | Feb. 21, 1928 |
| 2,109,460 | Brasher | Mar. 1, 1938 |
| 2,341,174 | Bohannon | Feb. 8, 1944 |
| 2,457,401 | Rupley | Dec. 28, 1948 |
| 2,482,027 | Poole | Sept. 13, 1949 |
| 2,518,068 | Rodanet | Aug. 8, 1950 |

FOREIGN PATENTS

| | | |
|---|---|---|
| 525,975 | Germany | May 31, 1931 |
| 1,046,515 | France | Dec. 7, 1953 |